US012110717B2

(12) United States Patent
Graute et al.

(10) Patent No.: US 12,110,717 B2
(45) Date of Patent: Oct. 8, 2024

(54) MOTOR VEHICLE LOCK

(71) Applicant: Brose Schließsysteme Gmbh & Co. Kommanditgesellschaft, Wuppertal, Wuppertal (DE)

(72) Inventors: Ludger Graute, Essen (DE); Andreas Hoffmann, Voerde (DE); Markus Zillert, Düsseldorf (DE)

(73) Assignee: Brose Schließsysteme GmbH & Co. Kommanditgesellschaft, Wuppertal (DE)

( * ) Notice: Subject to any disclaimer, the term of this patent is extended or adjusted under 35 U.S.C. 154(b) by 61 days.

(21) Appl. No.: 17/480,868

(22) Filed: Sep. 21, 2021

(65) Prior Publication Data

US 2022/0090419 A1 Mar. 24, 2022

(30) Foreign Application Priority Data

Sep. 22, 2020 (DE) ..................... 10 2020 124 698.6

(51) Int. Cl.
*E05B 81/16* (2014.01)
*E05B 77/02* (2014.01)
(Continued)

(52) U.S. Cl.
CPC .............. *E05B 81/16* (2013.01); *E05B 77/02* (2013.01); *E05B 81/06* (2013.01); *E05B 81/14* (2013.01);
(Continued)

(58) Field of Classification Search
CPC .......... E05B 81/14; E05B 81/06; E05B 81/90; E05B 83/36; E05B 85/26; E05B 77/32
See application file for complete search history.

(56) References Cited

U.S. PATENT DOCUMENTS 6,053,543 A * 4/2000 Arabia, Jr. .............. E05B 77/28 292/216
2017/0159331 A1* 6/2017 Handke .................. E05B 81/16
(Continued)

FOREIGN PATENT DOCUMENTS

DE 19702420 A1 7/1998
DE 10048709 A1 4/2002
(Continued)

OTHER PUBLICATIONS

Espacenet machine translation of DE 202014104111 U1, generated Apr. 26, 2023 (Year: 2023).*

*Primary Examiner* — Kristina R Fulton
*Assistant Examiner* — Emily G. Brown
(74) *Attorney, Agent, or Firm* — Dickinson Wright PLLC

(57) ABSTRACT

A motor vehicle including a latch and a pawl, the latch is adjustable between an open position and a locked position, the pawl is adjustable between a lowered position and a raised position, a drive arrangement which, in an opening movement, adjusts an adjusting arrangement such that the adjusting arrangement raises the pawl, an actuating lever and a clutch arrangement arranged between the actuating lever and the pawl, in the disengaging state, the actuating stroke of the actuating lever is an idle stroke with regard to the raising of the pawl and in the engaging state, the pawl is able to be raised via the actuating stroke of the actuating lever, the adjusting arrangement with the opening movement, shifts the clutch arrangement from the disengaging state to the engaging state. An unlocking movement shifts the clutch arrangement from the disengaging state into the engaging state via the adjusting arrangement.

16 Claims, 6 Drawing Sheets

(51) Int. Cl.

| | |
|---|---|
| ***E05B 81/06*** | (2014.01) |
| ***E05B 81/14*** | (2014.01) |
| ***E05B 81/90*** | (2014.01) |
| ***E05B 83/36*** | (2014.01) |
| ***E05B 85/26*** | (2014.01) |

(52) U.S. Cl.
CPC .............. *E05B 81/90* (2013.01); *E05B 83/36* (2013.01); *E05B 85/26* (2013.01)

(56) References Cited

U.S. PATENT DOCUMENTS

| | | | | |
|---|---|---|---|---|
| 2019/0136590 | A1 * | 5/2019 | Patane .................... | E05B 81/14 |
| 2020/0102772 | A1 * | 4/2020 | Ishiguro .................. | E05B 79/04 |
| 2022/0235588 | A1 * | 7/2022 | Kawanobe .............. | E05B 81/90 |

FOREIGN PATENT DOCUMENTS

| | | | | |
|---|---|---|---|---|
| DE | 202014104111 | U1 * | 1/2016 | ............. E05B 81/06 |
| DE | 102013110201 | A1 | 3/2016 | |
| WO | 2015113545 | A1 | 8/2015 | |
| WO | 2019076399 | A1 | 4/2019 | |
| WO | 2019202751 | A1 | 10/2019 | |
| WO | 2020147877 | A1 | 7/2020 | |

* cited by examiner a)

b)

a)

b)

c)

a)

b)

MOTOR VEHICLE LOCK

CROSS-REFERENCE TO RELATED APPLICATIONS

This application claims priority to German Patent Application No. DE 10 2020 124 698.6, filed on Sep. 22, 2020, the disclosure of which is hereby incorporated in its entirety by reference herein.

TECHNICAL FIELD

The present disclosure relates to a motor vehicle lock.

BACKGROUND

Motor vehicles may include a motor vehicle lock that is configured to lock a locking element of the motor vehicle. The term "locking element" should be interpreted broadly. It encompasses for example a side door, such a rear side door, a rear door, a tailgate, a boot lid, a front bonnet, an engine bonnet or the like. The locking element can be hinged to the body of the motor vehicle in the manner of a swing door or in the manner of a sliding door.

SUMMARY

The present disclosure aims to provide a simplified design of a motor vehicle lock with mechanical redundancy, which can be opened as part of an opening support function, in a motorized manner by means of the drive arrangement and in an emergency situation, in which motorized raising of the pawl is not possible on account of a fault, using least one additional drivetrain, such as an external door handle, which by a clutch arrangement, can be connected through to the pawl to be raised.

In an emergency, although unlocking of the motor vehicle lock is allowed via the clutch arrangement being shifted into the engaging state, simultaneous opening of the lock via motorized raising of the pawl is intended to be ruled out on account of the associated safety risks.

As an example, in an unlocking movement which extends in the opposite driving direction to the opening movement, the drive arrangement, starting from the starting position, shifts the clutch arrangement from the disengaging state into the engaging state via the adjusting arrangement.

On the one hand, according to the proposal, unlocking of the lock is still possible via the opening movement of the drive arrangement. However, on the other hand, with the unlocking movement, there is a separate driving movement, which allows unlocking, for example, without the risk of unintentional raising of the pawl and thus undesired opening of the lock latch. The motor vehicle lock according to the proposal may still manage in this case with a single drive arrangement, which is used both as a locking drive and as an opening support drive.

In one or more embodiments, the adjusting arrangement may include an adjusting spring arrangement which preloads the adjusting arrangement in the direction of the starting position. It is thus possible, with the adjusting spring arrangement, to easily ensure that the adjusting arrangement is reset without any action on the part of the drive arrangement.

The motor vehicle lock may include a locking arrangement with a pivotable locking lever, with the result that the shifting of the clutch arrangement is achieved with a particularly simple structure.

In one or more embodiments, the adjusting arrangement may include an adjusting lever, which is pivoted via the guide contour of a worm wheel, with the result that a reliable unlocking or locking and opening of the motor vehicle lock may be achieved.

In one or more embodiments, the locking arrangement may include a storage lever that holds the locking lever in the locking position in a mechanically stable manner, the locked state can be maintained even without the action of the drive arrangement. As an example, the storage lever is held in each case in a mechanically stable manner in the holding position and in the starting position, with the result that the storage lever remains automatically in the respective functional position.

The storage lever may accordingly also serve to transfer the locking lever from the locking position into the unlocking position, and so the storage lever acquires a dual function.

In one or more embodiments, a clutch lever of the clutch arrangement, may change between a disengaging position, in the disengaging state of the clutch arrangement, and in an engaging position, in the engaging state of the clutch arrangement. The clutch lever then serves, in the engaging position, to transmit the actuating stroke to the pawl.

In one or more embodiments, when the adjusting arrangement raises the pawl, with the opening movement, by means of a release lever, the clutch arrangement may be arranged between the actuating lever and the release lever. The clutch lever can in this case, may be arranged on the release lever, with the result that a relatively simple and compact structure of the clutch arrangement can be implemented.

In another embodiment, a further actuating lever for raising the pawl is provided. The further actuating lever may act on the pawl by means of the discussed release lever in order to achieve a compact structure of the motor vehicle lock.

In one or more embodiments, the adjusting arrangement may, in the opening movement, simultaneously adjust the locking lever into the unlocking position and cause the pawl to be raised, in order to maintain the locked state of the lock as far as possible. Alternatively, the adjusting arrangement can initially, in the opening movement, adjust the locking lever into the unlocking position and subsequently cause the pawl to be raised, with the result that unlocking without the pawl being raised is also possible by way of an only partially executed opening movement.

According to another embodiment, further measures for unlocking the motor vehicle lock via manual actuation, may be provided, even if the drive arrangement fails completely, the lock can be opened manually via the actuating lever.

BRIEF DESCRIPTION OF THE DRAWINGS

In the following text, the invention is explained in more detail by way of a drawing which illustrates only one exemplary embodiment and in which.

DETAILED DESCRIPTION

Figure 1:
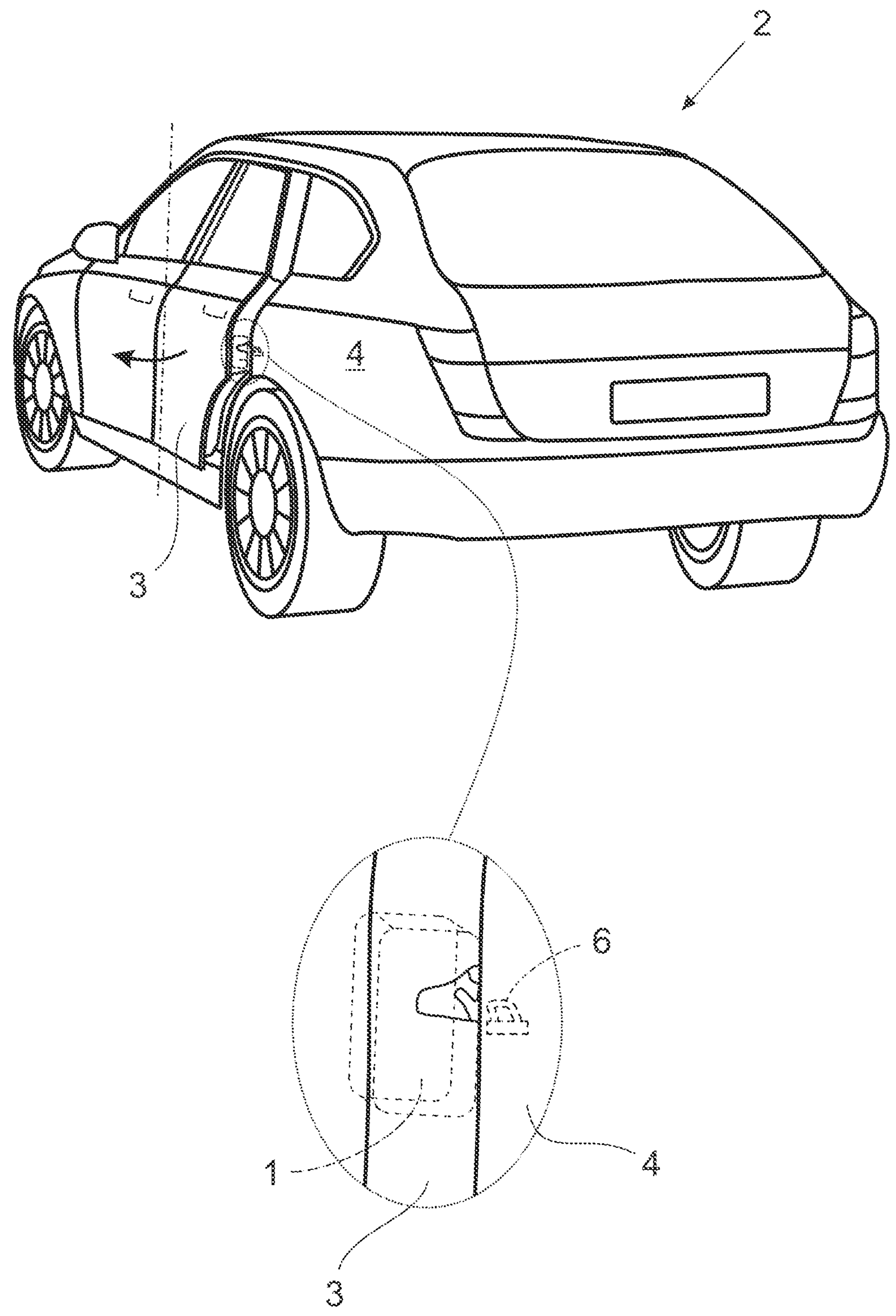
FIG. 1 shows a locking element of a motor vehicle in the form of a rear side door with a motor vehicle lock according to the proposal.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock is disclosed in DE 10 2013 110 201 A1, which includes with a lock latch that is pivotable about a geometric lock-latch axis and with at least one pawl that is pivotable about a geometric pawl axis, and the lock latch is adjustable into an open position and into at least one locked position, and the pawl, in a lowered position, holds the lock latch in the locked position, and, in a raised position, releases the lock latch. The motor vehicle lock has an electric drive arrangement which, in an opening movement, adjusts an adjusting arrangement starting from a starting position of the adjusting arrangement such that the adjusting arrangement raises the pawl with the opening movement of the drive arrangement.

Furthermore, the motor vehicle lock has an actuating lever that is pivotable about a geometric actuating-lever axis, wherein a clutch arrangement is arranged between the actuating lever and the pawl, said clutch arrangement being shiftable between an engaging state and a disengaging state. While, in the disengaging state, the actuating stroke of the actuating lever is idle with regard to the raising of the pawl, in the engaging state, the pawl is able to be raised via the actuating stroke of the actuating lever.

It is thereby possible to implement the motor vehicle lock as an "electric lock having mechanical redundancy", which can be opened in principle, as part of an opening support function, in a motorized manner by means of the drive arrangement. Only in the emergency situation in which motorized raising of the pawl is not possible on account of a fault, is provision made of at least one additional drivetrain, preferably to an external door handle, which, by means of the clutch arrangement, can be connected through to the pawl to be raised.

The known motor vehicle lock is advantageous in as much as a dual use of the drive arrangement as a locking drive, for the one part, and as an opening support drive is provided, wherein the adjusting arrangement, with the opening movement, shifts the clutch arrangement from the disengaging state into the engaging state. However, this dual use represents a constructive challenge, since the drive arrangement has to drive the clutch arrangement, for the one part, and the closing element, for the other part, without the two functions to be implemented impeding one another. The known motor vehicle lock in this case relies on a mechanical dual stroke function for the internal actuating lever, such that the lock can be opened even without a functional drive arrangement.

The motor vehicle lock 1 according to the proposal and illustrated in the drawing can be assigned to any locking element of a motor vehicle 2. As regards the further understanding of the term "locking element", reference may be made to the introductory part of the description. In the exemplary embodiment that is illustrated, the locking element is a side door 3, in this case a rear side door, of the motor vehicle 2. All statements made in this regard apply accordingly to all other kinds of locking elements.

Figure 2:
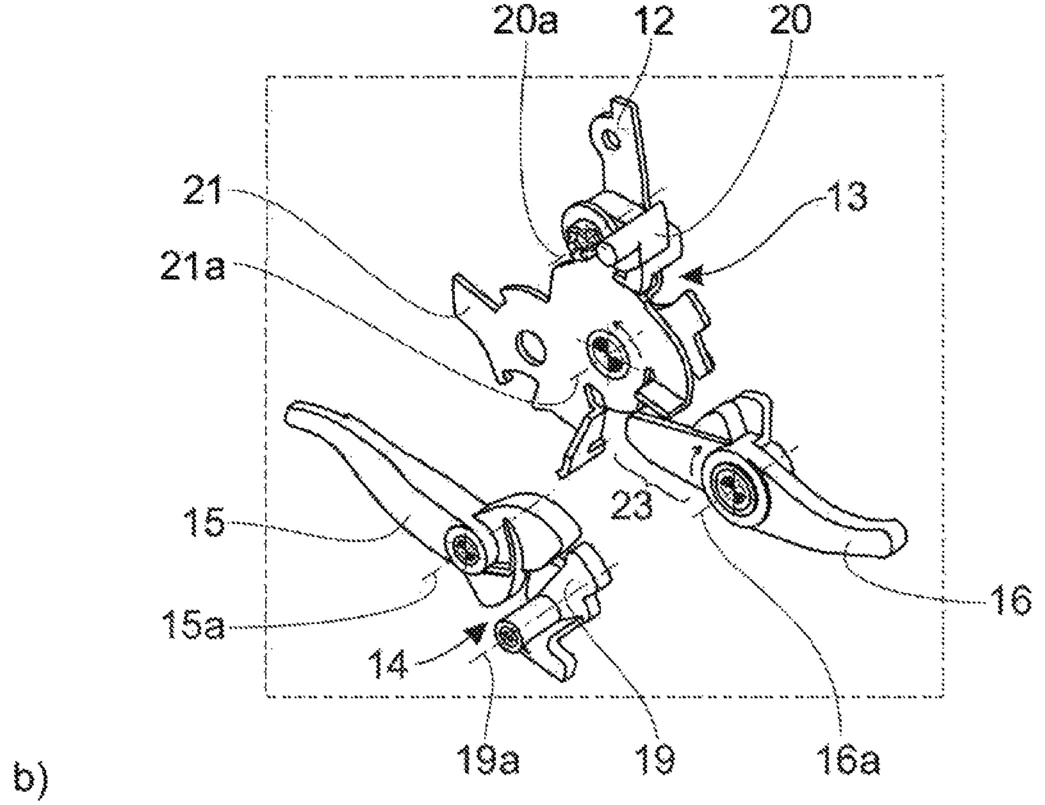
FIGS. 2*a* and 2*b* show essential adjustable components of the motor vehicle lock according to FIG. 1 in a perspective illustration and partially in an exploded illustration, FIGS. 3*a*, 3*b*, and 3*c* each show some of the adjustable components of the motor vehicle lock according to FIG. 1 in the opening movement, FIGS. 4*a*, 4*b*, and 4*c* each show the components from FIGS. 3*a*, 3*b*, and 3*c* in the unlocking movement, FIGS. 5*a* and 5*b* each show a rear view of the components from FIGS. 4*a*, 4*b*, and 4*c* with the clutch arrangement in the disengaging state and in the engaging state, and FIGS. 6*a* and 6*b* each show the components from FIGS. 4*a*, 4*b*, and 4*c* during the opening movement after a previously effected unlocking movement.
Figure 2:
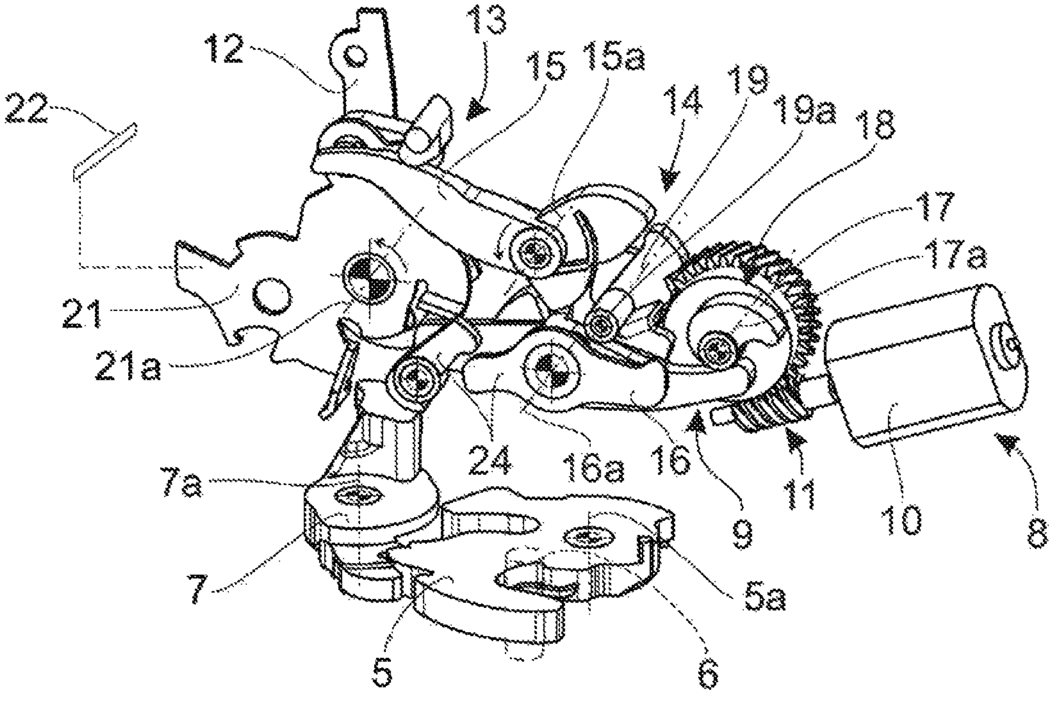

In order to create a holding action between the side door 3 and the body 4 of the motor vehicle 2, the motor vehicle lock 1 is equipped with a lock latch 5, which is adjustable about a geometric lock-latch axis 5*a* into an open position, into at least one locked position, such as into a main locked position illustrated in FIG. 2, and optionally into a pre-locked position between the open position and the main locked position. The lock latch 5 cooperates in a conventional manner per se with a locking part 6, in this case and may be in the form of a striker, in order to hold the side door 3 in its respective locked position. In this case, the lock latch 5 is arranged on the side door 3 while the locking part 6 is arranged on the motor vehicle body 4. This can also be provided the other way around.

In order to realize the above holding action, the motor vehicle lock 1 has at least one pawl 7, in this case exactly one pawl 7. The solution according to the proposal can also be readily applied to a two-pawl system, however. For the purposes of a clear illustration, the following statements relate to an arrangement with only one single pawl 7, however.

Figure 3:
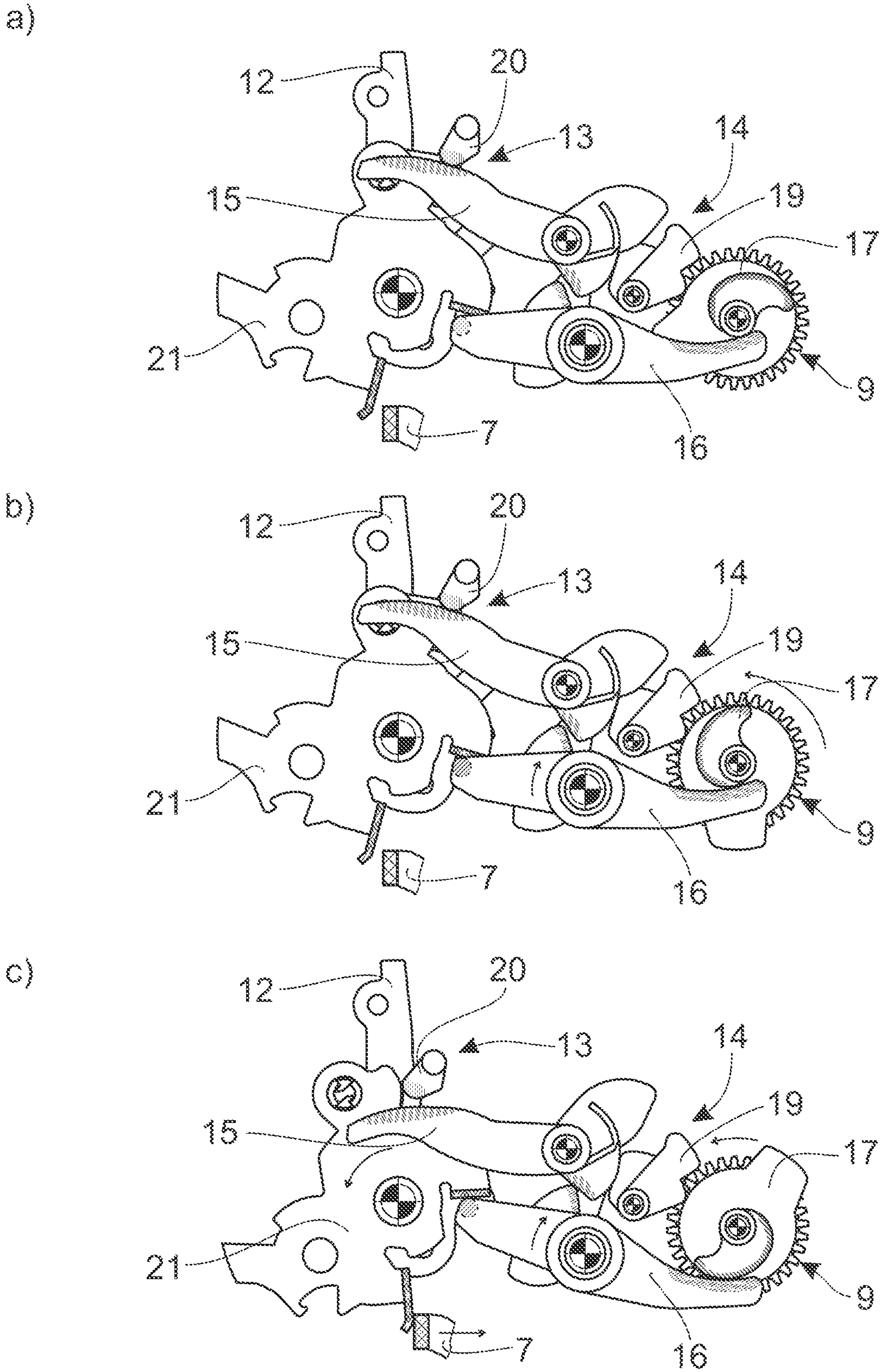
Figure 4:
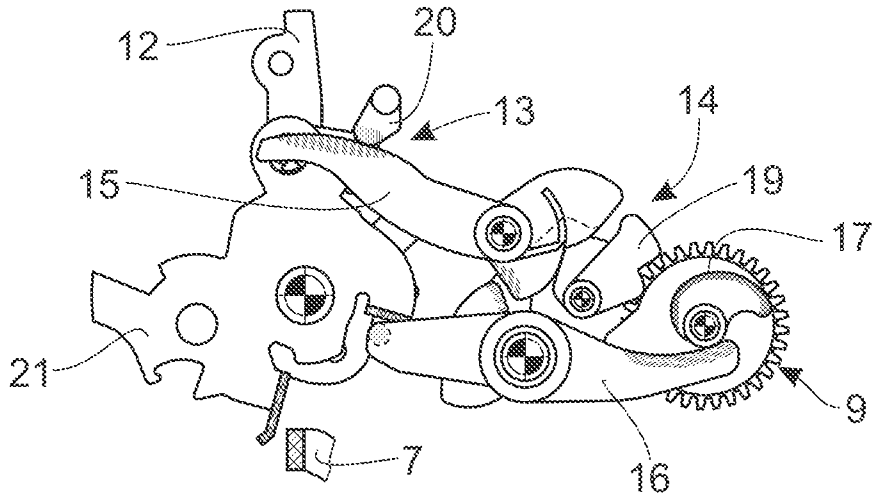
Figure 4:
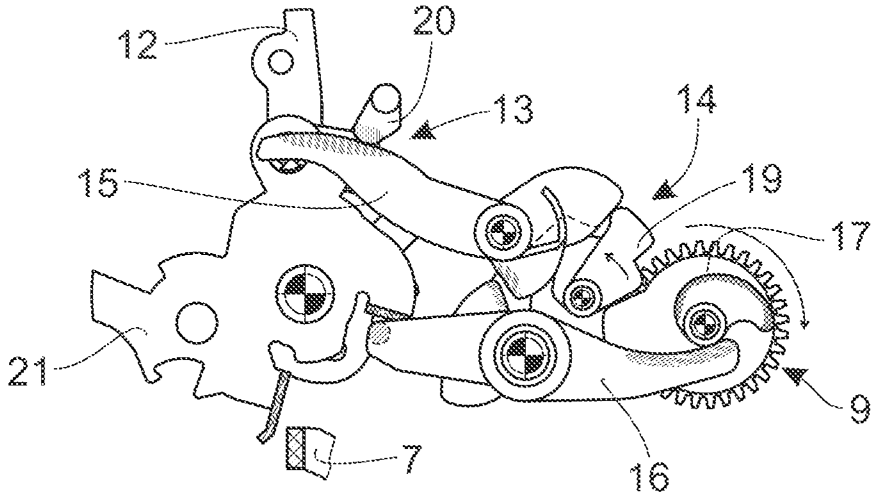
Figure 4:
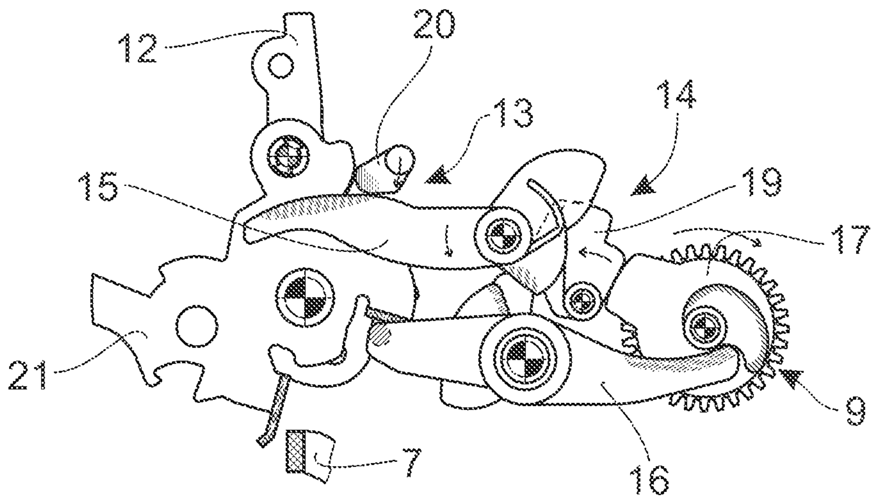
Figure 5:
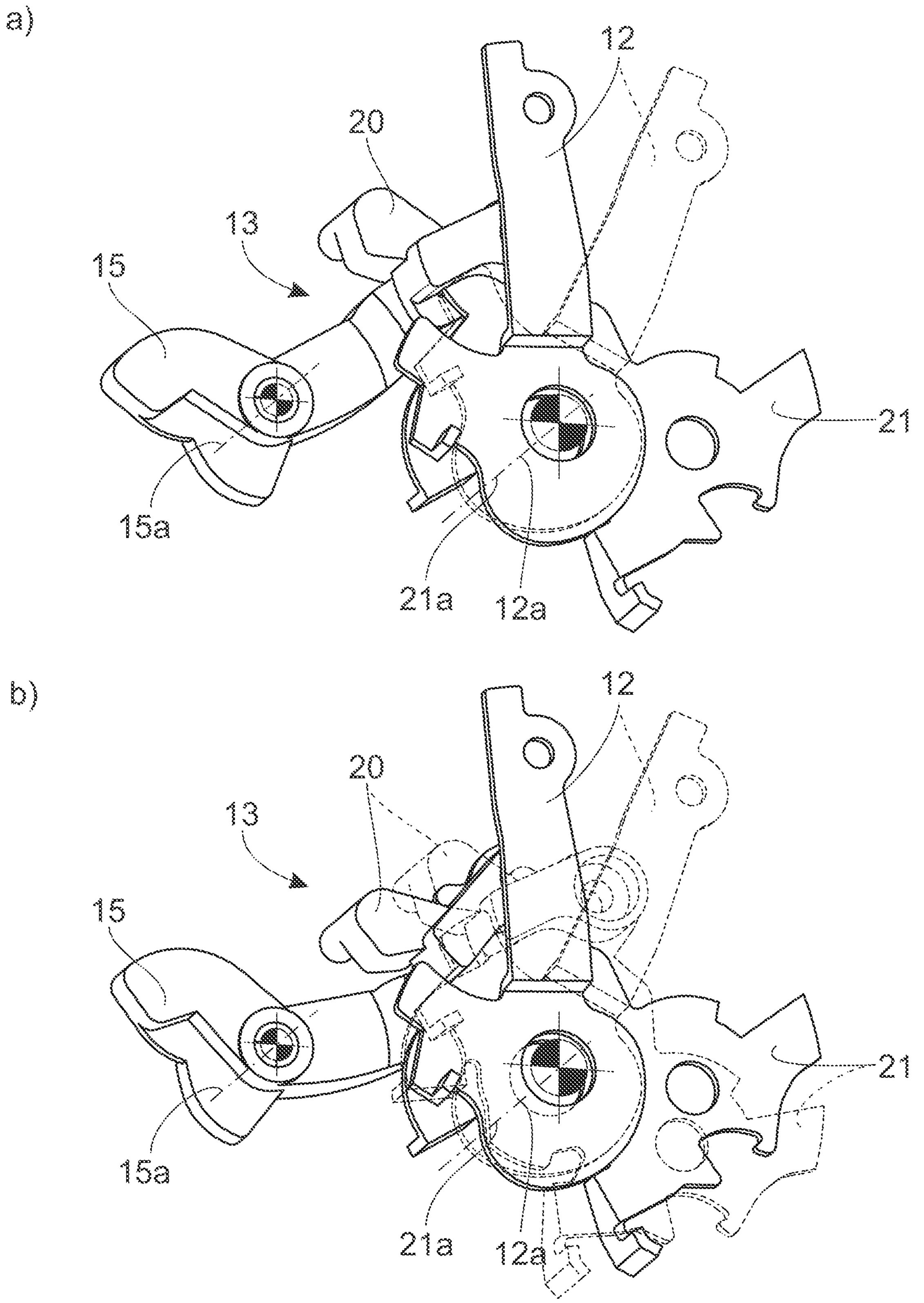

The pawl 7, which in this case is pivotable about a geometric pawl axis 7*a*, is in a lowered position (FIG. 2, FIG. 3*a*), FIG. 3*b*), FIG. 4, FIG. 5*a*)), in which it holds the lock latch 5 in the at least one locked position, and is adjustable in a raised position (FIG. 3*c*), FIG. 6*b*)), in which it releases the lock latch 5.

To raise the pawl 7, the motor vehicle lock 1 has an electric drive arrangement 8 having driving directions, which, in an opening movement, adjusts an adjusting arrangement 9 starting from a starting position of the adjusting arrangement 9, such that the adjusting arrangement 9 raises the pawl 7 with the opening movement of the drive arrangement 8.

In the exemplary embodiment that is illustrated, the drive arrangement 8 is equipped with a drive motor 10, which is coupled to the adjusting arrangement 9 via a worm gear 11. In this case, the drive arrangement 8 is equipped with a single drive motor 10, allowing a simple and compact construction of the motor vehicle lock 1. In the present case, the driving directions should be understood as being the two directions of rotation of the drive motor 10, which may be a rotary electric motor.

The adjusting arrangement 9 generally effects a mechanical conversion of the opening movement of the drive arrangement 8 into a movement of the pawl 7 in order to raise the pawl 7. As an example, in FIG. 3*a*), the starting position of the adjusting arrangement 9 is illustrated, and the opening movement, which will be explained in more detail below, as shown in FIG. 3*b*) and FIG. 3*c*), results in the pawl 7 being raised.

To raise the pawl 7, the motor vehicle lock 1 has an actuating lever 12 that is pivotable about a geometric actuating-lever axis 12*a* and is adjustable, in an actuating stroke, from a starting position into an actuating position. An actuating stroke may include at least one outgoing movement from the starting position into the respective actuating position of the actuating lever 12.

This actuating lever 12 may be an external actuating lever, that is to say a lever which, in the mounted state, is coupled to an external door handle of the side door 3. This actuating lever 12 is not necessarily the only one of the motor vehicle lock 1, this also being explained in more detail below.

Moreover, a clutch arrangement 13 that is shiftable between an engaging state (FIG. 3*c*), FIG. 4*c*), FIG. 6*a*)) and a disengaging state (FIG. 3*a*), FIG. 3*b*), FIG. 4*a*), FIG. 4*b*), FIG. 6*b*)) is arranged between the actuating lever 12 and the pawl 7. In the disengaging state, the actuating stroke of the actuating lever 12 is an idle stroke as regards the raising of the pawl 7. The pawl 7 is thus not raised by the actuating stroke in the disengaging state. In the engaging state, by contrast, the pawl 7 is able to be raised by the actuating stroke of the actuating lever 12, wherein the actuating stroke is converted into a movement of the pawl 7 for raising the pawl 7. As a result of the shifting from the engaging state into the disengaging state, the motor vehicle lock 1 is consequently locked. Conversely, as a result of the shifting from the disengaging state into the engaging state, the motor vehicle lock 1 is unlocked. Conversely, as a result of the shifting from the disengaging state into the engaging state, the motor vehicle lock 1 is unlocked.

The actuating lever may be set up for manual actuation. In this case, the term "manual actuation" stands for actuation that conducts a user movement via a mechanical connection to the component in question and triggers a mechanical adjusting movement there. In this case, in the mounted state, a user movement of the external door handle can be transmitted, with the clutch arrangement 13 in the engaging state, mechanically to the pawl 7 in order to raise the pawl 7, in order to implement mechanical redundancy. For emergency operation, such as when the power supply of the motor vehicle fails, a mechanical force action chain to the pawl 7 is thus additionally provided.

The adjusting arrangement 9 shifts, with the opening movement, the clutch arrangement 13 from the disengaging state into the engaging state, as is also clear from FIG. 3. Starting from the starting position with the clutch arrangement 13 in the disengaging state (FIG. 3*a*), FIG. 3*b*)), the opening movement indicated by the arrow, in this case initially causes the clutch arrangement 13 to be shifted into the engaging state. Subsequently, the pawl 7 is raised by means of the adjusting arrangement 9 in the course of the further opening movement indicated by the arrow (FIG. 3*c*)), wherein the clutch arrangement is in this case still in the engaging state.

The "shifting" of the clutch arrangement 13 from the disengaging state into the engaging state by the adjusting arrangement 9 should be understood broadly in the present case, and the clutch arrangement 13 can also only be released by the adjusting element 9 to be transferred into the engaging state and, for example, the clutch arrangement 13 can be brought into the engaging state under spring loading. The adjusting arrangement 9 therefore does not necessarily have to force the clutch arrangement 13 into the engaging state, but rather merely ensure that the clutch arrangement 13 can adopt the engaging state in a manner unimpeded by the adjusting arrangement 9.

The drive arrangement 8, starting from the starting position, in an unlocking movement that extends in the opposite driving direction to the opening movement, shifts the clutch arrangement 13 via the adjusting arrangement 9 from the disengaging state into the engaging state.

Consequently, with the unlocking movement, there is an alternative driving movement to the opening movement, which extends in the opposite direction to the opening movement at least starting from the starting position, and which results in the motor vehicle lock 1 being unlocked. In this case it is the case that it is not possible for the pawl 7 to be raised by means of the adjusting arrangement 9 via the unlocking movement, and so the unlocking movement can then be used deliberately when only unlocking of the motor vehicle lock 1 is necessary, with opening being avoided, for instance in emergency operation.

The unlocking movement is illustrated in more detail in FIG. 4. Starting from the starting position with the clutch arrangement 13 in the disengaging state (FIG. 4*a*)), the unlocking movement is started in the driving direction which extends in the opposite direction to the driving direction of the opening movement. As is indicated by the arrow in FIG. 4*c*), the clutch arrangement 13 is shifted from the disengaging state into the engaging state via the adjusting arrangement 9 (FIG. 4*c*)). In the unlocking movement, the pawl 7 remains in the lowered position, since in this case, the adjusting arrangement 9 does not act on the pawl 7 in the unlocking movement.

The adjusting arrangement 9 may include an adjusting spring arrangement (not illustrated in detail here), which, in the driving directions, preloads the adjusting arrangement 9 in each case in the direction of the starting position. Both after the opening movement has been executed and after the unlocking movement has been effected, the adjusting spring arrangement therefore causes the adjusting arrangement 9 to be reset into the starting state illustrated in FIG. 3*a*) and 4*a*), as a result of which, in turn, the clutch arrangement 13 can be put into the disengaging state. The drive arrangement 8 and the worm gear 11 may be configured so as not to be self-locking, and so, after the respective driving movement, the resetting into the starting position takes place under a currentless drive motor 10.

In this case, the motor vehicle lock 1 has an unlocking arrangement 14, which has a locking lever 15 that is pivotable about a geometric locking-lever axis 15*a* between a locking position (FIG. 3*a*), FIG. 3*b*), FIG. 4*a*), FIG. 4*b*)) and an unlocking position (FIG. 3*c*), FIG. 4*c*)). The locking lever 15, in the unlocking position, shifts the clutch arrangement 13 into the engaging state. Furthermore, the adjusting arrangement 9, in the opening movement, shifts the clutch arrangement 13 via adjustment of the locking lever 15 into the unlocking position, as is clear from the transition from FIG. 3*a*) to FIG. 3*b*). As an example, the locking lever 15 is also used in the unlocking movement, and, as illustrated in FIG. 4*b*) and FIG. 4*c*), the adjusting arrangement 9, in the unlocking movement, likewise shifts the clutch arrangement 13 via adjustment of the locking lever 15 into the unlocking position.

In this case, the locking lever 15 is spring-preloaded in the direction of the locking position, and the locking lever 15, in the locking position, holds the clutch arrangement 13 in the disengaging state. As a result, the clutch arrangement 13 adopts the disengaging state in the starting position of the adjusting arrangement 9.

According to the configuration that is illustrated, the adjusting arrangement 9 has an adjusting lever 16 that is pivotable about a geometric adjusting-lever axis 16*a*, and a worm wheel 17 that is rotatable about a geometric axis of rotation 17*a* and pivots the adjusting lever 16 by way of a guide contour 18 in a rotational movement. In this case, the drive arrangement 8 is coupled to the worm wheel 17 via the worm gear 11, and the rotary driving movement of the drive motor 10 is converted into rotation of the worm wheel 17. The opening movement corresponds in this case to a rotary movement of the worm wheel 17 in the counter-clockwise direction in FIG. 3 and the unlocking movement corresponds to a rotary movement of the worm wheel 17 in the clockwise direction in FIG. 4. The guide contour 18 may be an eccentric, circumferential guide surface, which, in the opening movement, but not in the unlocking movement, comes into contact with the adjusting lever 16.

As an example, it is the case here that the adjusting arrangement 9, in the opening movement, shifts the clutch arrangement 13 into the unlocking position via direct mechanical contact between the adjusting lever 16 and the locking lever 15. The adjusting lever 16 in this case acquires a dual function with the raising of the pawl 7 and the shifting of the clutch arrangement 13 in the opening movement (FIG. 3). The unlocking movement may be performed without adjustment of the adjusting lever 16. As an example, the adjusting arrangement 9, in the unlocking movement, shifts the clutch arrangement 13 via the worm wheel 17 (FIG. 4).

According to one or more embodiments, the locking arrangement 14 may include a storage lever 19, which is adjustable between a starting position (FIG. 4*a*), in which the storage lever 19 releases the locking lever 15, and a holding position (FIG. 4*c*), in which the storage lever 19 holds the locking lever 15 in the locking position. In this case, the storage lever 19 is configured to be pivotable about a geometric storage-lever axis 19*a*. The storage lever 19 is held in a mechanically stable manner in the holding position, in particular by a spring arrangement (not illustrated here) associated with the storage lever 19. As a result, when the storage lever 19 is transferred into the holding position illustrated in FIG. 4*c*), the storage lever 19 holds the locking lever 15 in the locking position and thus ensures the engaging state of the clutch arrangement 13 even after the adjusting arrangement 9 has been reset.

The storage lever 19 may be held in each case in a mechanically stable manner in the holding position and in the starting position, in particular by a toggle-spring arrangement associated with the storage lever 19. The storage lever 19 is thus mechanically bistable and configured to be shiftable between the holding position and the starting position.

Figure 6:
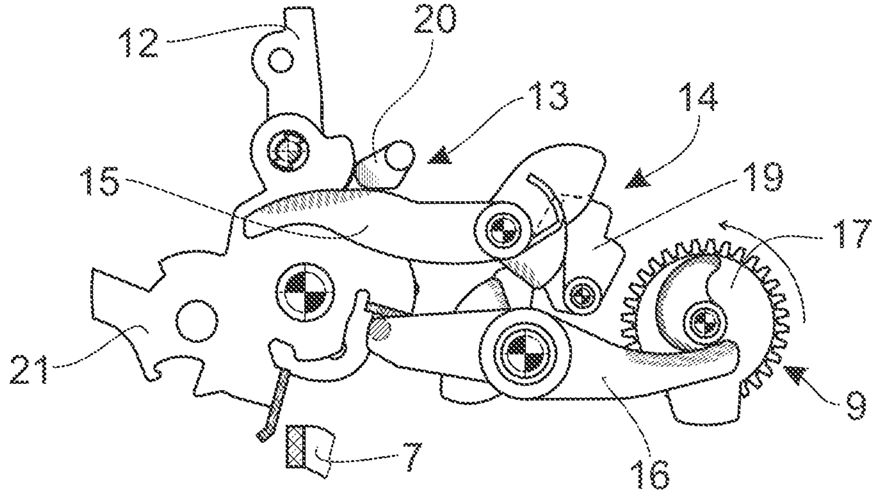
Figure 6:
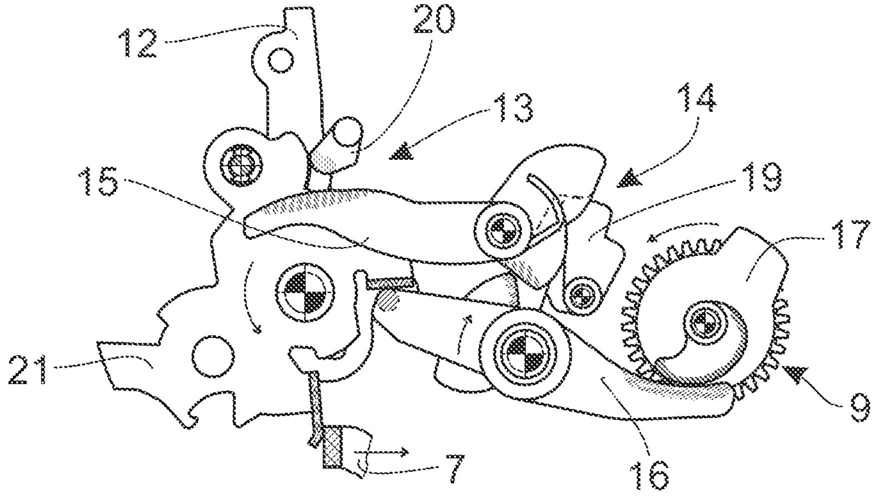

The adjusting lever 16 of the adjusting arrangement 9 may adjust, with the opening movement, the storage lever 19 from the holding position into the starting position. In FIG. 6, an opening movement starting from the starting position is shown, in which the storage lever 19 is held, after a previous unlocking movement according to FIG. 4, in the holding position, and thus the locking lever 15 is in the unlocking position and the clutch arrangement 13 is in the engaging state (FIG. 6*a*)). With the opening movement, in addition to the above-described raising of the pawl, the storage lever 19 is also transferred into the starting position (FIG. 6*b*)), and so, after the opening movement, the clutch arrangement 13 can return into the disengaging state again, since the holding of the locking lever 15 by the storage lever 19 is undone.

In this case, the clutch arrangement 13 may include a clutch lever 20 that is pivotable about a geometric clutch-lever axis 20*a*. In the disengaging state of the clutch arrangement 13, the clutch lever 20 is in a disengaging position in which the clutch lever 20, during an actuating stroke of the actuating lever 12, is out of coupling engagement with the actuating lever 12. In FIG. 5*a*), the clutch lever 20 is in such a disengaging position. An adjusting movement can then not be transmitted from the actuating lever 12 to the pawl 7.

Moreover, in the engaging state of the clutch arrangement 13, the clutch lever 20 is in an engaging position in which the clutch lever 20, during an actuating stroke of the actuating lever 12, is in coupling engagement with the actuating lever 12 or comes into coupling engagement with the actuating lever 12. This is shown in FIG. 5*b*). In coupling engagement, an adjusting movement can then be transmitted from the actuating lever 12 to the pawl 7.

As an example, the adjusting arrangement 9 raises the pawl 7 with the opening movement by means of a release lever 21 that is pivotable about a geometric release-lever axis 21*a* and is arranged between the adjusting arrangement 9 and pawl 7. The clutch arrangement 13 may be arranged between the actuating lever 12 and the release lever 21 and connects the actuating lever 12 in the engaging state to the release lever 21.

The geometric clutch-lever axis 20 a extends parallel to the geometric actuating-lever axis 12 a of the actuating lever 12. The clutch lever 20 may be arranged on the release lever 21 so as to be pivotable about the clutch-lever axis 20 a. The geometric clutch-lever axis 20 a may be arranged for conjoint rotation on the actuating lever 12, meaning that the geometric clutch-lever axis 20 a moves together with the actuating lever 12 when the latter is adjusted between its starting position and its actuating position. The clutch lever 20 may be spring-preloaded in the direction of its engaging position.

In one or more embodiments, the motor vehicle lock 1 has a further actuating lever 22, which is merely indicated in FIG. 2 and is pivotable about a geometric actuating-lever axis, in particular an internal actuating lever, and, as a result of the actuating stroke of the further actuating lever 22, the pawl 7 is able to be raised. The further actuating lever 22 may raise the pawl 7 by way of the actuating stroke, likewise by means of the above-described release lever 21.

It is conceivable for the adjusting arrangement 9, in the opening movement, to simultaneously adjust the locking lever 15 into the unlocking position and to cause the pawl 7 to be raised. However, as already explained with regard to FIG. 3, the adjusting arrangement 9 initially, in the opening movement, adjusts the locking lever 15 into the unlocking position and subsequently causes the pawl 7 to be raised.

According to yet another embodiment, the adjusting arrangement 9, the adjusting lever 16, may include an emergency release portion 23, illustrated in FIG. 2, which is provided for manual actuation of the adjusting arrangement 9 for raising the pawl and/or for adjusting the locking lever into the unlocking position. In this case, the emergency release portion 23 can be reached for example via a tool from outside the motor vehicle lock 1 and a force can be exerted on the adjusting lever 16.

As an example, the motor vehicle lock 1 has a mechanical emergency unlocking section 24 for adjusting the locking lever 15 into the unlocking state. As illustrated in FIG. 2, the emergency unlocking section 23 in this case and preferably causes, when released, the storage lever 19 to be adjusted into the holding position. The emergency unlocking section 24 may be coupled, in the mounted state, to a lock cylinder (not illustrated).

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

1 motor vehicle lock
2 motor vehicle
3 side door
4 motor vehicle body
5 lock latch
6 locking part
7 pawl
8 drive arrangement
9 element
10 drive motor
11 worm gear
12 actuating lever
13 clutch arrangement
14 unlocking arrangement
15 locking lever
16 lever
17 worm wheel
18 guide contour
19 storage lever
20 clutch lever
21 release lever
22 actuating lever
23 emergency release portion
24 emergency unlocking section
5*a* geometric lock-latch axis
7*a* geometric pawl axis
12*a* geometric actuating-lever axis
15*a* geometric locking-lever axis
16*a* geometric adjusting-lever axis
17*a* rotation
19*a* geometric storage-lever axis
20*a* geometric clutch-lever axis
21*a* geometric release-lever axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock comprising:

a lock latch configured to pivot about a geometric lock-latch axis and including a pawl configured to pivot about a geometric pawl axis, wherein the lock latch is configured to be adjusted between an open position and a locked position, wherein the pawl is configured to be adjusted to a lowered position, in which the pawl holds the lock latch in the locked position, and a raised position, in which the pawl releases the lock latch;

an adjusting arrangement;

an electric drive arrangement configured to move the adjusting arrangement in a first drive direction so the adjusting arrangement executes an opening movement from a starting position to adjust the adjusting arrangement such that the adjusting arrangement raises the pawl;

an actuating lever configured to pivot about a geometric actuating-lever axis; and a clutch arrangement arranged between the actuating lever and the pawl and configured to shift between an engaging state, wherein during an actuation stroke of the actuation lever, the pawl is permitted to be raised by the actuation stroke, and a disengaging state, in which, the actuation stroke of the actuation lever is an idle stroke and does not permit raising of the pawl, wherein adjustment of the adjusting arrangement and the opening movement of the electric drive arrangement shifts the clutch arrangement from the disengaging state to the engaging state, wherein the electric drive arrangement is configured to move the adjusting arrangement from the starting position in a second drive direction, opposite the first drive direction, to execute an unlocking movement, and shift the clutch arrangement from the disengaging state to the engaging state, and wherein the clutch arrangement includes a clutch lever configured to pivot about a geometric clutch-lever axis, wherein when the clutch arrangement is in the disengaging state and during the actuation stroke of the actuating lever, the clutch lever is in a disengaging position in which the clutch lever is out of coupling engagement with the actuating lever, wherein when the clutch arrangement is in the engaging state, the clutch lever is in an engaging position in which the clutch lever is in coupling engagement with the actuating lever or is configured to come into coupling engagement with the actuating lever during the actuation stroke of the actuating lever.

2. The motor vehicle lock of claim 1, wherein the adjusting arrangement includes an adjusting spring arrangement configured to preload the adjusting arrangement towards the starting position as the adjusting arrangement moves in the first or second drive directions.

3. The motor vehicle lock of claim 1, further comprising:

a locking arrangement provided with a locking lever configured to pivot about a geometric locking-lever axis between a locking position and an unlocking position, wherein when the locking lever is in the unlocking position, the locking lever shifts the clutch arrangement to the engaging state, and wherein as the adjusting arrangement executes the opening movement, the clutch arrangement shifts to an unlocking position of the clutch arrangement via adjustment of the locking lever.

4. The motor vehicle lock of claim 3, wherein the locking lever is spring-preloaded in a direction of the locking position, and when the locking lever is in the locking position, the locking lever holds the clutch arrangement in the disengaging state.

5. The motor vehicle lock of claim 3, wherein the locking arrangement includes a storage lever configured to be adjusted between a storage starting position, in which the storage lever releases the locking lever, and a holding position, in which the storage lever holds the locking lever in the locking position, and a spring arrangement configured to hold the storage lever in the holding position in a mechanically stable manner.

6. The motor vehicle lock of claim 5, wherein an adjusting lever and the opening movement adjusts the storage lever from the holding position to the storage starting position.

7. The motor vehicle lock of claim 1, wherein the adjusting arrangement includes an adjusting lever, configured to pivot about a geometric adjusting-lever axis, and a worm wheel configured to rotate about an axis of rotation, wherein the worm wheel includes a guide contour configured to pivot the adjusting lever as the worm wheel rotates.

8. The motor vehicle lock of claim 1, wherein as the adjusting arrangement executes the opening movement and/ or the unlocking movement, a storage lever transfers a locking lever from a locking position to an unlocking position.

9. The motor vehicle lock of claim 1, further comprising:

a release lever configured to pivot about a geometric release-lever axis and arranged between the adjusting arrangement and the pawl, wherein as the adjusting arrangement executes the opening movement, the release lever is configured to raise the pawl.

10. The motor vehicle lock of claim 9, wherein the clutch lever is arranged on the release lever and configured to pivot about the clutch-lever axis.

11. The motor vehicle lock of claim 1, further comprising:

a further actuating lever configured to pivot about a further geometric actuating-lever axis, wherein during an actuating stroke of the further actuating lever, the pawl is permitted to be raised by the further actuating lever.

12. The motor vehicle lock of claim 1, wherein, as the adjusting arrangement executes the opening movement, the adjusting arrangement simultaneously adjusts a locking lever to an unlocking position and causes the pawl to be raised.

13. The motor vehicle lock of claim 1, wherein the adjusting arrangement includes an emergency release portion configured to provide manual actuation of the adjusting arrangement to raise the pawl and/or to adjust a locking lever to an unlocking position.

14. The motor vehicle lock of claim 1, further comprising:

a mechanical emergency unlocking section configured to adjust a locking lever to an unlocking state.

15. The motor vehicle lock of claim 1, wherein the lock latch is configured to be adjusted between the open position and a main locked position.

16. The motor vehicle lock of claim 1, wherein the clutch arrangement is arranged between the actuating lever and a release lever, and wherein when the clutch arrangement is in the engaging state, the clutch arrangement is configured to connect the actuating lever to the release lever.

* * * * *